(No Model.)

J. G. OWEN.
HARROW.

No. 353,079. Patented Nov. 23, 1886.

WITNESSES:

INVENTOR:
J. G. Owen
BY
ATTORNEYS.

UNITED STATES PATENT OFFICE.

JAMES GREEN OWEN, OF COVELLO, WASHINGTON TERRITORY.

HARROW.

SPECIFICATION forming part of Letters Patent No. 353,079, dated November 23, 1886.

Application filed August 18, 1886. Serial No. 211,194. (No model.)

*To all whom it may concern:*

Be it known that I, JAMES GREEN OWEN, of Covello, in the county of Columbia and Territory of Washington, have invented a new and Improved Harrow, of which the following is a full, clear, and exact description.

My invention relates to harrows, and has for its object to provide an inexpensive and substantial harrow, capable of adapting itself to all irregularities of land surface and of working on uneven ground or side hills without "tracking," thus allowing effective harrowing of all soils.

The invention consists in certain novel features of construction and combinations of parts of the harrow, all as hereinafter fully described and claimed.

Reference is to be had to the accompanying drawings, forming a part of this specification, in which similar letters of reference indicate corresponding parts in both the figures.

Figure 1:
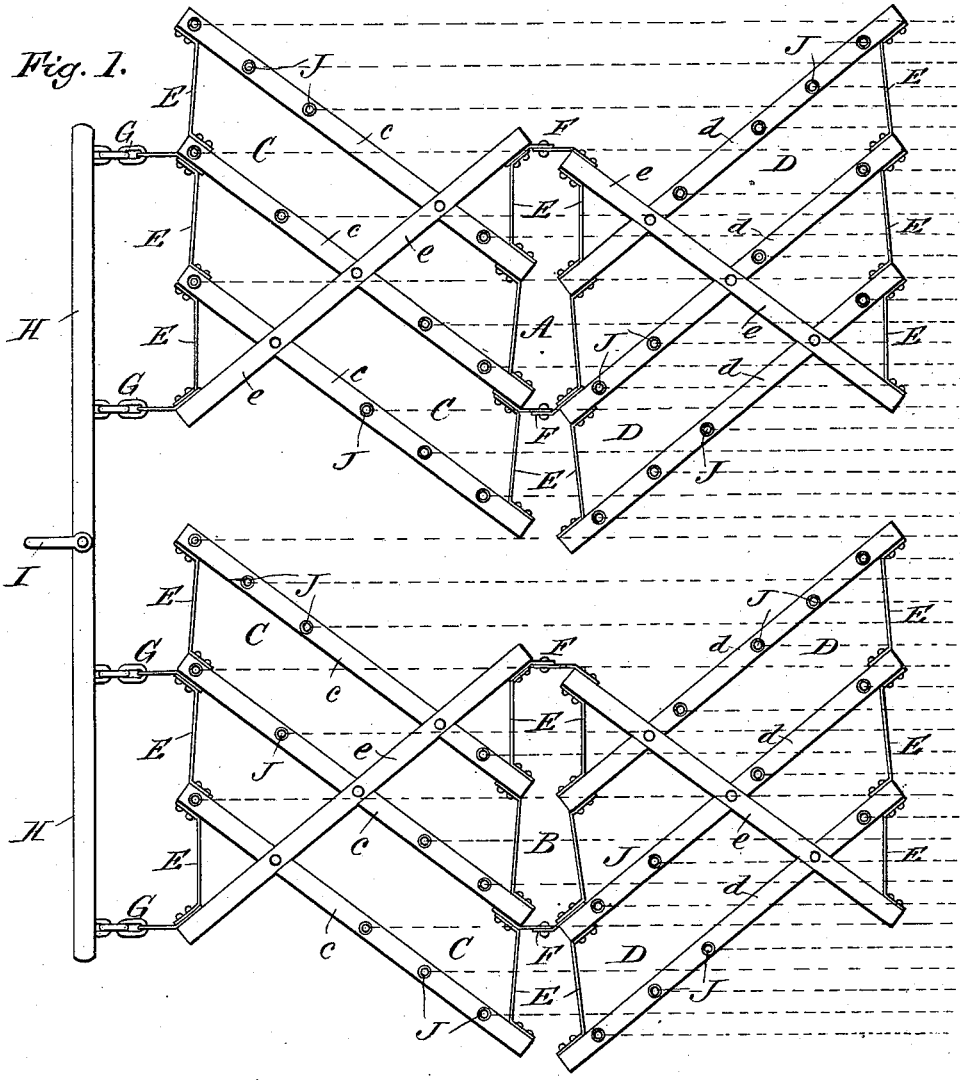
Figure 2:

Figure 1 is a plan view of my improved harrow, the paths of travel of the harrow-teeth being indicated in dotted lines; and Fig. 2 is a side view of the harrow with the rear hinged parts on high ground.

The harrow is made in two main double sections, A B, each section comprising front and rear half-sections or parts, C D, consisting of series of tooth-carrying bars $c\ d$ respectively, and a diagonally-ranging brace-bar, $e$, all connected at the ends of each part C D of the harrow-sections by spacing and brace irons or bars E. The tooth-carrying bars $c\ d$ are set at an angle of about forty-five degrees from the line of draft of the harrow, the front series of bars, $c$, ranging backward toward the left hand, while the rear series of bars, $d$, range backward toward the right hand—in other words, the front and rear series of bars, $c\ d$, of each double section of the harrow converge toward the longitudinal centers of the double sections, as shown in Fig. 1 of the drawings.

The front and rear parts, C D, of each double section of the harrow are coupled together by hinges, as at F F, allowing independent vertical movement of all four of the harrow-sections, and the front parts, C C, of each double section of the harrow are coupled by suitable flexible bar, link, and staple connections at G G with a draft-beam, H, to which the horses will be hitched by means of an attached clevis, I, or other suitable device.

The harrow-teeth J are fitted in the diagonally-ranging bars $c\ d$ of the harrow in such relation to each other as will cause them in traveling over the ground to mark or harrow it in lines spaced about two inches apart, as indicated by the dotted lines in Fig. 1 of the drawings.

As the harrow is drawn over the ground, the front or rear parts, C D, of the double sections of the harrow will adapt themselves to inequalities of the ground surface in all directions, and as instanced by the rear harrow-sections in Fig. 2 of the drawings, and no part of the ground will escape the proper action of the harrow-teeth, and the diagonal or converging arrangement of the tooth-bars $c\ d$, together with the coupling of the front and rear parts, C D, of the harrow-sections by hinges F not allowing lateral play of one part C on its connected part D causes the harrow to run truly and effectively on side hills, and without tracking or running of one tooth in the path of a preceding or forward tooth, and which is a common tendency of many forms of harrows on side-hill work. Furthermore, this harrow is not so liable to clog as a flat rigid harrow, and may be more easily cleared of trash, and does not have the swinging or lateral motion from side to side that a stiff harrow has, as will readily be understood.

Having thus fully described my invention, I claim as new and desire to secure by Letters Patent—

1. A harrow made with front and rear toothed sections or parts hinged together for free movement vertically, and the tooth-holding bars of the front and rear sections arranged diagonally or converged horizontally toward the longitudinal center or hinge-joint of the harrow, substantially as shown and described.

2. The combination, in a harrow, of front and rear toothed sections or parts hinged together for free movement vertically, and the tooth-holding bars of the front and rear sections arranged diagonally or converged horizontally toward the longitudinal center or hinge-joint of the harrow, and flexible or jointed connections from the front section to a draft beam or device, substantially as shown and described.

3. The combination, in a harrow, of front and rear sections, C D, formed, respectively, of bars c d, provided with teeth J, brace-bars e, and braces E, and said sections C D hinged together at F F, and the bars c d of said sections arranged diagonally or converged horizontally toward the longitudinal center or hinge-joint of the harrow, and flexible or jointed connections from the front section, C, to a draft beam or device, substantially as described, for the purposes set forth.

4. A harrow made in two double sections, connected by flexible couplings, as at G, to a draft beam or device, as at H, and each of said double sections comprising independent front and rear sections, C D, formed, respectively, with braced bars c d, provided with teeth J and hinged together at F F, and said bars c d of sections C D arranged to converge horizontally toward the longitudinal center or hinge-joint of the harrow, substantially as described, for the purposes set forth.

JAMES GREEN OWEN.

Witnesses:
T. B. GILMOUR,
J. E. EDMISTON.